United States Patent [19]

Rayne

[11] Patent Number: 4,577,534
[45] Date of Patent: Mar. 25, 1986

[54] FRONT SUSPENSION ALIGNMENT TOOL
[75] Inventor: Joseph Rayne, Clinton, Mich.
[73] Assignee: Chrysler Corporation, Highland Park, Mich.
[21] Appl. No.: 718,765
[22] Filed: Apr. 1, 1985
[51] Int. Cl.⁴ .................. B25B 27/00; B25B 13/48
[52] U.S. Cl. ..................................... 81/484; 81/121.1
[58] Field of Search ............... 81/121.1, 484, 488; 29/271; 254/1; 280/661

[56] References Cited

U.S. PATENT DOCUMENTS

| | | | |
|---|---|---|---|
| 2,988,939 | 6/1961 | Schiller | 81/484 |
| 3,830,467 | 8/1974 | Sprague et al. | 81/121.1 X |
| 3,915,431 | 10/1975 | Castoe | 81/484 X |
| 3,917,308 | 11/1975 | Schulz | 280/661 X |
| 4,364,288 | 12/1982 | Castoe | 81/488 |

Primary Examiner—James G. Smith
Attorney, Agent, or Firm—Edward P. Barthel

[57] ABSTRACT

A camber adjusting tool in a strut type vehicle suspension system. The tool is in the form of a socket wrench having an eccentric cam portion defining a cylindrical cam surface having its radius of curvature offset from the principal axis of the socket. The cam surface is adapted to be positioned in cammed engagement with raised guide surfaces of a strut-clamping bracket when the head of a wheel support bolt is received in the socket recess.

2 Claims, 8 Drawing Figures

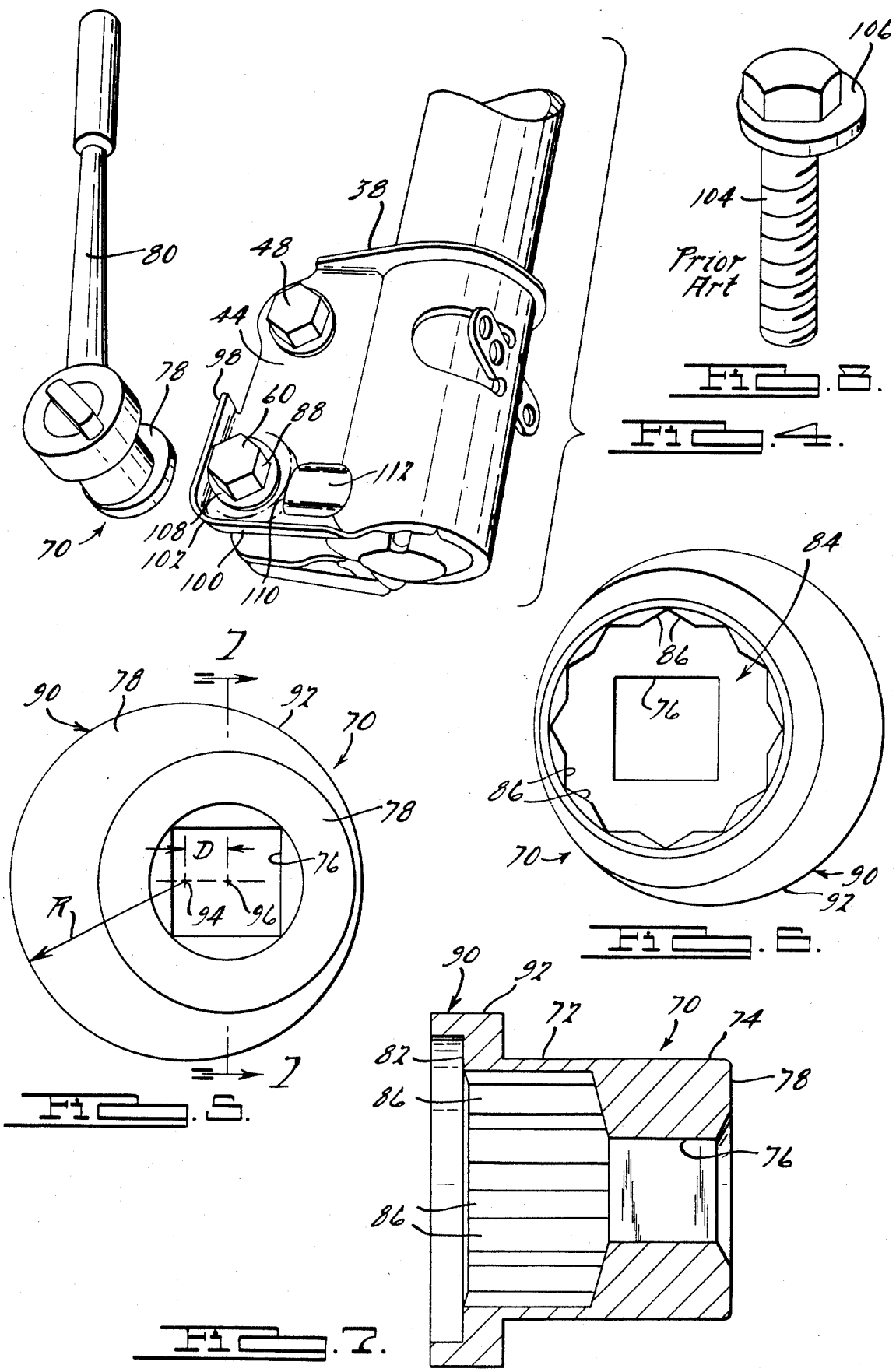

FRONT SUSPENSION ALIGNMENT TOOL

BACKGROUND OF THE INVENTION

This invention relates to wheel alignment adjusting devices and more particularly to a camber adjusting tool for a strut type vehicle suspension.

Conventional alignment adjusting devices used for adjusting the camber and toe for front wheel drive vehicles are found in Schultz U.S. Pat. No. 3,917,308. The Schultz patent discloses through-bolt fasteners holding a clamping bracket on the strut lower end to the neck portion of a wheel support knuckle. A rotary cam element is located on one bolt and trapped between guide cheeks on the holding clamp. The cam is rotatably adjustable to force the clamp and knuckle angularly to varying camber relationships.

The U.S. Pat. No. 4,313,617 to Muramatsu et al. discloses a camber adjusting device including an eccentric adjustment piece rotatably provided on the steering knuckle. Rotation of the piece causes the strut support bracket to be displaced about the knuckle by a valve of eccentricity of the piece whereby the strut is displaced with respect to the steering knuckle adjusting the camber angle.

The U.S. Pat. No, 4,418,938 to Sullivan et al. provides an adjustable set screw device threadably mounted on the knuckle to abut the strut lower end. The set screw opposes the force couple imposed by the vehicle spring mass to hold a selected camber position.

SUMMARY OF THE INVENTION

With the present invention the disadvantages of the above mentioned prior art devices have been obviated. One advantage achieved is the use of conventional through-bolts in place of a variety of cam-bolts or specialized adjustment pieces as taught by Muramatsu et al, for example. It is a feature of the present invention to provide an eccentric cam socket tool which permits ready camber alignment of a vehicle by a service technician with the use of a conventional socket wrench holder. The tool adds no direct cost to the vehicle and does not require further special formations not presently found on the strut suspension elements.

These and other objects, features and advantages of the invention will be readily apparent from the following specification and drawings wherein:

FIG. 4 is an enlarged, fragmentary perspective view of the tool and strut support clamp;

FIG. 5 is an enlarged detail attachment end view of tool;

FIG. 6 is an enlarged detail recess end view of the tool;

FIG. 7 is a vertical sectional view taken on line 7—7 of FIG. 5; and

FIG. 8 is a perspective view of the prior art cam-bolt.

DESCRIPTION OF THE PREFERRED EMBODIMENT

Figure 1:
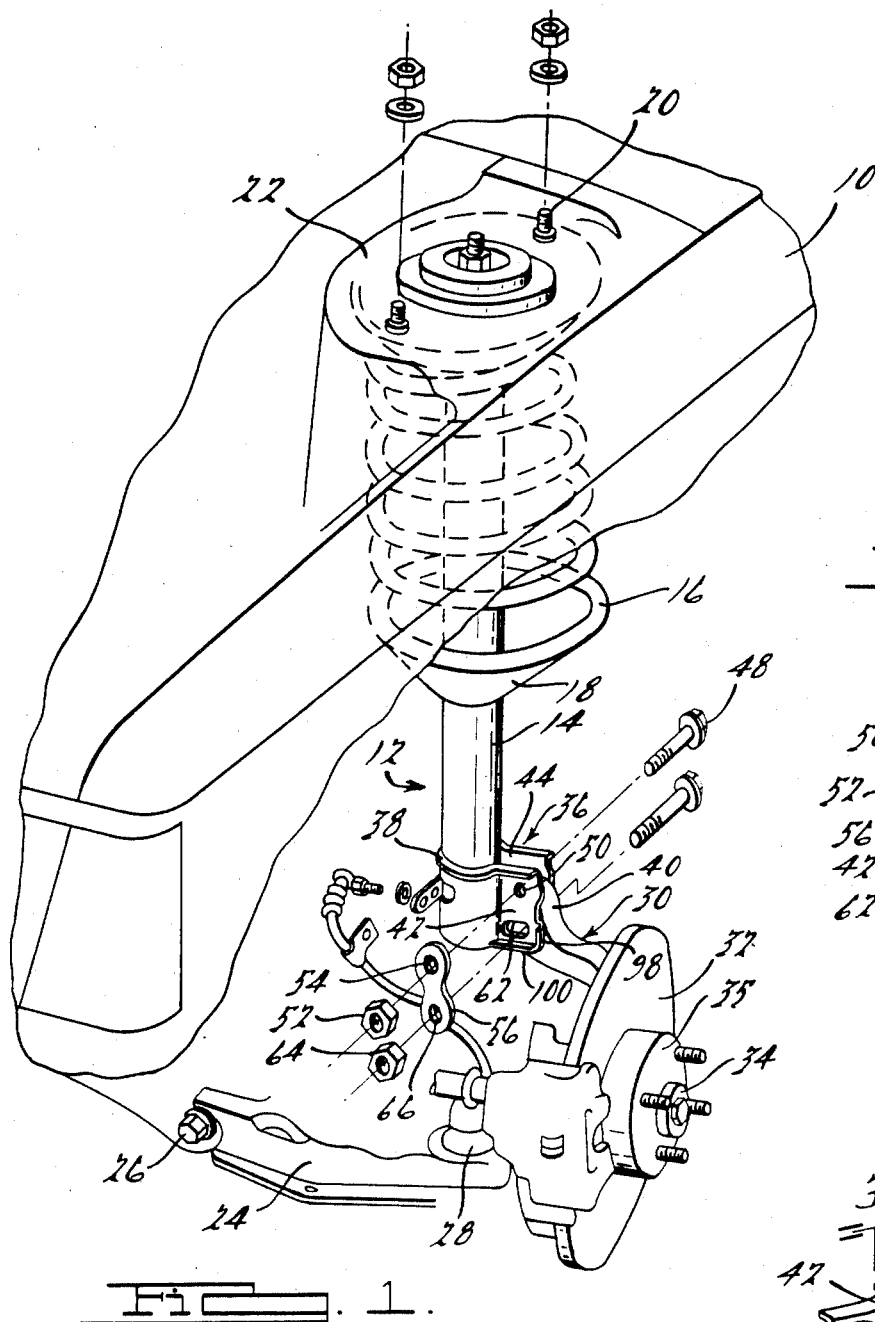
FIG. 1 is a fragmentary exploded perspective view of a vehicle strut type suspension.
Figure 3:
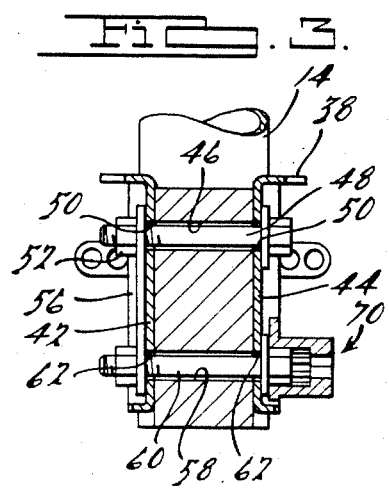
FIG. 3 is a fragmentary, vertical sectional view taken on the line 3—3 of FIG. 2.

Referring now to FIG. 1 of the drawings, the invention is illustrated in connection with an independent front suspension for a front wheel drive automotive vehicle. Only the front left-hand portion of the vehicle, indicated generally at 12, will be described. The suspension 12 is a "McPherson Type" with a vertical shock absorbing strut member 14 formed of telescopic upper and lower piston and cylinder members which, are adopted to foreshorten or extend under wheel motion for dampening thereof. The strut member 14 also includes a helical suspension spring 16 between a seat element 18 on the lower telescopic element and a seat, not shown, at the top of the strut member associated with an upper piston element. Such upper seat may include suitable rubber isolation and rotary bearing elements such as shown in Pacis et al U.S. Pat. No. 4,260,176 issued Apr. 7, 1981 and assigned to the assignee of the present application. Bolts 20 fixedly attach the upper end of the strut member 14 to a mounting panel or tower 22 in non-adjustable relationship therewith.

A lower control arm 24 of the suspension extends laterally from pivot connections 26 including brackets on a vehicle rail assembly (not shown). The arm 24 carries a ball joint 28 at its outboard end adapted for connection to a wheel support member or steering knuckle 30. The knuckle includes suitable mounting means for a caliper disc brake 32 together with a mounting spindle 34 with a vehicle wheel support assembly 35 rotatably attached thereto.

Figure 2:
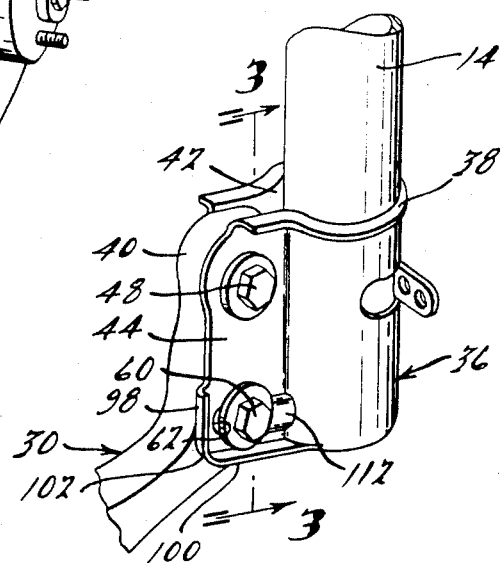
FIG. 2 is an enlarged fragmentary perspective view of the strut clamp and steering knuckle.

In FIGS. 1 and 2 the lower end of the strut member 14 is shown with a clamping saddle bracket 36 of sheet metal stock formed with a reinforcement flange 38. The bracket 36 is generally U-shaped with a jacket portion that surrounds the strut and attached thereto as by spot welding. An upper neck portion 40 of the strut 30 is clamped between first and second clamping legs 42 and 44 of the support bracket 36. An upper through hole 46 for receiving an upper through-bolt 48 is formed at a location adjacent the upper neck portion 40 of the steering knuckle 30 in a cross-wise direction. Aligned upper guide holes 50 are formed in each of the legs 42 and 44. An upper nut 52 is threaded onto upper bolt 48 through upper hole 54 of a dog-bone washer 56.

A lower through hole 58 for receiving a lower through-bolt 60 is formed in vertical alignment below the upper through hole 46. Aligned horizontally extending lower guide slots 62 are formed in each of the legs 42 and 44. A lower nut 64 is threaded onto the lower bolt 60 through lower hole 66 of the washer 56. With the upper and lower bolts 48 and 60 in place the camber of the steering knuckle is preset during factory assembly of the vehicle by suitable tooling means. In the preferred arrangement strut assembly alignment is performed robotically to achieve exact camber adjustment with standard hex-head bolts by arcuate movement of the lower bolt 60 on the flange leg slots 62 about the pivot center of the upper bolt 48. An example of such a robot is shown and described in Kiba et al., U.S. Pat. No. 4,498,414 the disclosure of which is incorporated by reference herein.

To allow post assembly camber adjustment of the front wheel (not shown) a tool, generally indicated at 70 in FIGS. 3-7, is provided to loosen, turn and tighten the lower bolt 60. The tool 70 includes an annular wrench having a socket end portion 72 and a manipulating end portion 74. The end portion 74 has a square-sectioned hole 76 in end face 78 for snap-in insertion of a conventional ratchet-type wrench handle 80.

The socket end portion 72 has its end face 82 formed with a recess, generally indicated at 84, defined by a plurality of planar faces 86. In the form shown the faces are arranged in pairs to provide a conventional twelve point recess 84 adapted to engage the flat sides 88 of the lower bolt hex head. The socket end portion 72 has an eccentric cam portion 90 formed adjacent its end face 82. As seen in FIG. 5 the eccentric cam portion 90 has an outer circular cam surface 92 defined by radius R. The center point of the radius R is shown at 94 offset a predetermined distance D from the center 96 of the principal axis of the annular tool 70.

With reference to FIG. 4 it will be noted that the flange arm 44 is formed with a pair of reinforcement flanges 98 and 100 joined by a lower right-angle radiused corner 102. It is current practice to accomplish front suspension alignment by means of a special prior art through cam-bolt 104, shown in FIG. 8, having an eccentric cam 106 formed integral therewith in place of the concentric integral washer 108 (FIG. 4) of the conventional lower through-bolt 60. The prior art cam-bolt 104 eccentric cam 106 is designed to rest between raised guide surfaces which in the preferred embodiment are reinforcement flange 98 and inner edge 110 of a raised lug 112 formed in leg 44. Using the prior art cam-bolt 104 it is presently necessary, during assembly of the vehicle, to adjust the wheel camber by rotating the cam-bolt 104 with a standard socket head wrench tool. In this way the cam-bolt eccentric cam 106 engages the flange 98 and lug inner edge 110 to adjust the bracket 36 by arcuate travel via slots 62 relative to the steering knuckle neck portion 40.

By means of the present invention the standard through-bolt 60 is precisely located in the adjustment slots 62 and robotically tightened at the proper camber adjustment during initial assembly thus improving initial build quality together with reduced cost and time. With the tool 70 subsequent alignment in the field is returned to the service technician. With the tool socket recess 84 fitted over the lower bolt head and rotated the tool eccentric cam surface 92 is brought into engagement with raised guide surfaces such as the reinforcing flange 98 and the lug edge 110 of the present embodiment. The tool 70 thus provides ready camber adjustment in the field with the use of a standard through bolt.

Although only one embodiment of the invention has been disclosed and described, it is apparent that other embodiments and modifications are possible without departing from the scope of the invention.

What is claimed is:

1. A tool comprising a cylindrical socket having its one end formed with handle attachment means and its other end formed with a bolt head receiving recess having flat wall portions adapted to drivingly engage a head of a bolt with which the tool is to be used, said recess end having an eccentric cam portion thereon, said eccentric cam portion defining a cylindrical cam surface having its radius of curvature offset a defined distance from the principal axis of said socket, said cylindrical cam surface adapted to be positioned in cammed engagement with raised guide surfaces adjacent slot means in a first structural member, a second stationery structural member having a through bore aligned with said first structural member slot means, the through-bolt adapted to extend through the first structural member slot means and the second structural member through bore, whereby upon rotation of the socket causing threaded turning of the through-bolt, the first structural member is moved along the slot means relative to the second structural member and the through-bolt to achieve selected adjustment of the first structural member relative to the second structural member within the range of movement permitted by said slot means.

2. A tool for adjustment of the camber setting of a vehicle strut suspension of the class including a wheel support member and an upstanding strut member, a clamp-type bracket having a jacket portion surrounding said strut member terminating in first and second clamping legs, said first and second legs including an upper set of horizontally aligned bolt receiving holes and a lower set of horizontally aligned bolt receiving slots, a portion of said wheel support means received between said legs and including upper and lower bolt receiving bores each registered in combination with a corresponding one of said upper holes and lower slots, upper and lower through-bolts extending through respective sets of said bolt receiving holes and bolt receiving slots, at least one clamping leg having opposed outwardly raised guide surfaces formed thereon adjacent one said lower bolt receiving hole, said lower through-bolt having its head intermediate said raised guide surfaces and a torque nut on its threaded end, said tool member comprising a cylindrical socket having its one end formed with handle attachment means and its other end formed with a bolt head receiving recess having flat wall portions adapted to drivingly engage said lower bolt head, said recess end having an eccentric cam member positioned thereon, said eccentric cam member defining a cylindrical cam surface having its radius of curvature offset a defined distance from the principal axis of said socket, said cylindrical cam surface being positioned in cammed engagement with said raised guide surfaces when said lower bolt head is received in said socket recess, such that upon rotation of said socket causing threaded turning of said through-bolt whereby said bracket is moved along said slots relative to said wheel support means and said lower through-bolt to achieve selected camber settings of said wheel support member within the range of movement permitted by said bracket slots.

* * * * *